United States Patent [19]

VanDeMark

[11] Patent Number: 5,060,560
[45] Date of Patent: Oct. 29, 1991

[54] LOW-WATER ELEMENT SAFETY CONTROL

[76] Inventor: Lowell VanDeMark, 11370 N. Shelborne Rd., Zionsville, Ind. 46077

[21] Appl. No.: 462,579

[22] Filed: Jan. 9, 1990

[51] Int. Cl.$^5$ ............................................. A47J 27/00
[52] U.S. Cl. ..................................... 99/337; 99/330; 99/331; 392/401
[58] Field of Search ................. 99/326, 330, 331, 332, 99/334, 337, 338, 403, 410, 468, 492, 486; 392/400, 401; 137/341, 392; 126/373, 374; 219/489, 401, 440, 441

[56] References Cited

U.S. PATENT DOCUMENTS

| | | | |
|---|---|---|---|
| 3,421,538 | 1/1969 | Hembree | 137/392 |
| 3,660,635 | 5/1972 | Liebert | 392/401 |
| 3,688,683 | 9/1972 | Boggs | 99/330 |
| 3,788,302 | 1/1974 | Malaney et al. | 99/330 |
| 3,919,523 | 11/1975 | Wadia et al. | 219/441 |
| 4,217,482 | 8/1980 | Wadia | 99/337 |
| 4,282,423 | 8/1981 | Volz | 99/337 |
| 4,289,954 | 9/1981 | Brognano et al. | 219/489 |
| 4,296,310 | 10/1981 | Luebke et al. | 219/440 |
| 4,491,146 | 1/1985 | Sveds | 219/324 |
| 4,503,320 | 3/1985 | Polster | 99/330 |

FOREIGN PATENT DOCUMENTS

| | | | |
|---|---|---|---|
| 0171522 | 2/1986 | European Pat. Off. | 99/330 |
| 1438907 | 6/1976 | United Kingdom | 99/330 |

*Primary Examiner*—Timothy F. Simone
*Attorney, Agent, or Firm*—Woodard, Emhardt, Naughton Moriarty & McNett

[57] ABSTRACT

A low-water element safety control for use with a steam generator. A steam cooker having a plurality of cooking compartments includes a steam-generator pressure vessel. An electric element within the vessel heats the water, causing steam to be directed to the compartment. A low-water sensor within the vessel is connected to a relay coil with contacts interrupting the flow of electrical energy to the heating element when water is beneath the level of the sensor. A second sensor located externally of the vessel and within a coupling in fluid communication with the vessel serves as a backup safety device and is connected to a second relay coil also having contacts interrupting the flow of electrical energy to the heating element when the water level is below the outside sensor.

13 Claims, 2 Drawing Sheets

LOW-WATER ELEMENT SAFETY CONTROL

BACKGROUND OF THE INVENTION

1. Field of the Invention

This invention is in the field of steam generators and devices and safety devices for interrupting the flow of energy to the heating element.

2. Description of the Prior Art

Steam cookers have a plurality of cooking compartments heated by means of steam flowing from a steam generator. A separate pressure vessel for generating the steam includes an electric element located therein. The heating element will fail in the event a sufficient amount of water does not surround the heating coil or element. The heating element is relatively expensive and is difficult to replace. As a result, various means have been provided to minimize such failures. Typically, a glass tube located outside of the vessel is connected via conduits in fluid communication with the vessel, thereby allowing for a visual indication of the level of water within the vessel. Such visual indicators may be located in remote positions and, therefore, may not provide a sufficient warning to the operator. Further, the operator is busy with various tasks and does not pay sufficient attention to the water level, resulting in eventual burnout of the heating element. In order to solve this problem, commercially available water level sensors have been mounted to extend into the vessel, measuring the level of the water therein. Such a probe is typically connected to a relay coil having contacts positioned in the electric line connected to the heating element. Thus, once the water level falls below the sensor, the relay coil will be activated, opening the coil contacts and interrupting the flow of electrical energy to the heating element.

Many of the prior steam generators utilize a mechanical float in lieu of electrical sensors for detecting the level of water within the pressure vessel. The float is then operable to disconnect the flow of energy to the heating element once the water level falls below a specified elevation. Such mechanical floats quickly develop scale buildup, resulting in inoperable level detectors and eventual failure of the heating element.

Despite the prior safety precautions, failures still occur of the heating element. The aforementioned low-water sensors extend into the pressure vessel and are exposed to a great volume of water and steam, resulting in scale buildup on the sensor, causing eventual failure of the sensor. Further, the probe is exposed to considerable heat within the vessel, resulting in a deterioration and eventual failure of the probe or sensor.

In order to solve the aforementioned problems, I have added a backup safety probe or sensor along with associated relay contacts to interrupt the flow of electrical energy to the heating element. Most importantly, I have located the backup, low-water sensor outside of the main pressure vessel in a conduit in fluid communication therewith, thereby reducing the scale buildup and deterioration of the backup sensor.

SUMMARY OF THE INVENTION

One embodiment of the present invention is a low water element safety control for a steam cooker having a closed container for holding liquid. The container has an entrance for introducing the liquid into the container with a steam exit associated with the container allowing escape of steam from the container. An electrical element is connected to a source of energy for heating the liquid. A first safety device has a first low liquid sensor located in the container which is connected to the element and operable to disconnect the element from the source of energy. A back up device is mounted in a liquid passage extending out of the container. The back up device is operable to disconnect the element from the source of energy when the liquid is below the additional low liquid sensor even though the first safety device is inoperable.

It is an object of the present invention to provide a new and improved low-water safety control for a steam cooker.

A further object of the present invention is to provide a new and improved steam cooking device.

In addition, it is an object of the present invention to provide a steam generator having a backup, low-water, safety control for protecting a heating element of a steam generator.

Related objects and advantages of the present invention will be apparent in the following description.

DESCRIPTION OF THE PREFERRED EMBODIMENT

Figure 4:
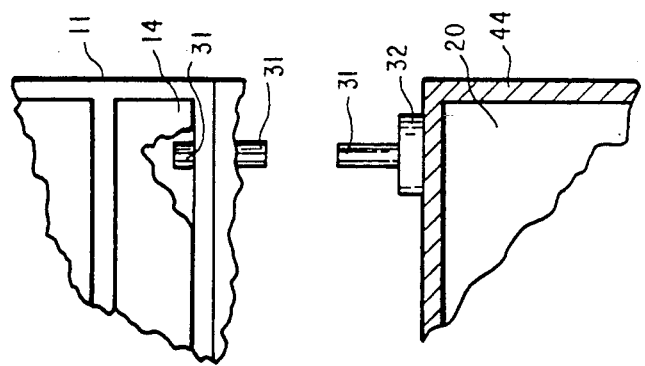
FIG. 4 is an enlarged fragmentary front view of the steam generator and cooking compartment.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
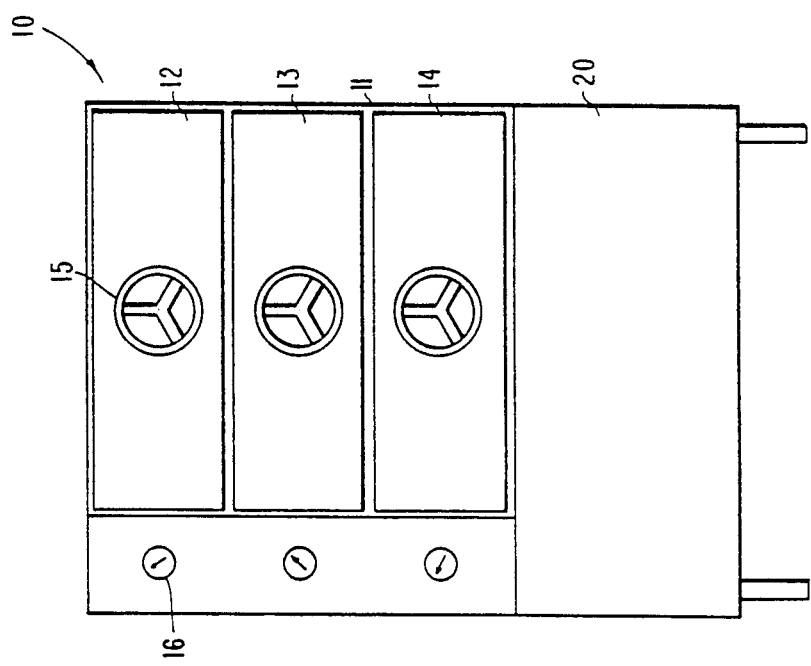
FIG. 1 is a front view of a steam cooker.

Referring now more particularly to FIG. 1, there is shown a conventional, commercially available steam cooker 10 having three separate cooking compartments opening through the front wall 11 of the cooker. The three compartments are closed respectively by conventional doors 12, 13, and 14, movably and sealingly mounted to front wall 11. A conventional handle 15 is provided for opening and closing each compartment door. Likewise, indicators 16 are associated with each compartment to allow the operator to determine the pressure and/or temperature within each compartment. The steam directed to each compartment is provided by a steam generator 20 located at the bottom of the cooker. Conventional construction is used in producing the cabinet of cooker 10 with the compartments behind doors 12, 13, and 14 being of five-sided construction with the sixth side being closed by the compartment door. Suitable slides within each compartment may be provided to allow for the insertion and removal of the items being cooked.

Commercially available steam cookers include a steam generator 20 (FIG. 2) having six walls sealingly joined together to prevent the escape of liquid and steam. Water is inserted into compartment 21 by means of a conduit 22 extending through sidewall 23. A conventional pump 24 is associated with conduit 22. The pump may be automatically activated by suitable sensors within compartment 21 for detecting the level of water within the compartment. A conventional electric heating element or coil 25 is mounted at the bottom portion 26 and is connected across a pair of wires 27 and 28, in turn, having terminals 29 and 30 connected to a suitable source of electrical energy. A steam outlet 31 is mounted to one of the walls of generator 20 with a commercially available steam control 32 being provided to allow for the controlled escape of steam from within compartment 21 via conduits to one or more of the three cooking compartments behind doors 12-14.

It is the practice in the prior art steam cookers to provide a low-level-water sensor 33 in turn operatively connected to relay coil 34 for opening and closing contacts 35 and 36 provided in line 28. Such a sensor is available from Warrick Controls under Stock No. F-104. The sensor has a single, external lead connected by wire 38 to terminal 39 of board 37. Magnetic relay coil 34 is connected between a source of energy and terminal 39. Once the distal end 40 of probe 33 detects water, coil 34 is activated, latching contacts 35 and 36 to the closed position and completing the circuit to element 25, causing the water to heat and steam to be generated.

I have added a backup safety probe and associated latching relay to further protect heating element 25. The additional probe is located externally of the pressure vessel or steam generator, thereby greatly alleviating the scale buildup and general deterioration of the probe as compared to probe 33 which extends into the pressure vessel.

Figure 3:
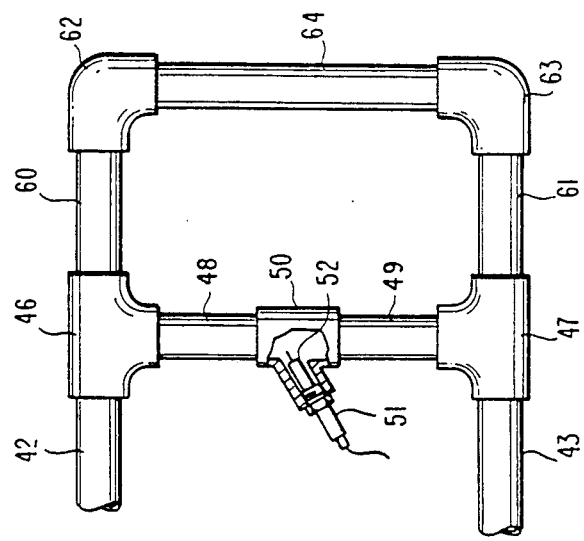
FIG. 3 is an enlarged fragmentary view of the backup safety control mounted to the right portion of the steam generator of FIG. 2.

My new backup safety means includes a top conduit 42 and bottom conduit 43 mounted to and extending through wall 44 of the steam generator. The outer ends of conduits 42, 43 are threadedly received by a pair of bull head T fittings 46 and 47, having mutually opposed threaded openings, in turn, threadably receiving linking conduits 48, 49. Mutually facing ends of conduits 48, 49 are threadedly received into a probe coupling 50 having removably mounted therein a backup probe 51 identical to probe 33. The distal end 52 (FIG. 3) of probe 51 extends into coupling 50 and is, therefore, in fluid communication by conduits 48, 49, 42, and 43 with the interior of the pressure vessel forming steam generator 20. Notably, the volume within coupling 50 even when added to the internal volume of conduits 42, 43, 48, 49 and fittings 46, 47 is of significantly less volume than the volume of compartment 21, thereby minimizing the amount of water and steam in contact with sensor 51.

Notably, distal end 52 of probe 51 is at the same elevation 55 above bottom wall 54 of the vessel as the distal end 40 of probe 33. The outer end of probe 51 is connected by wire 56 to terminal 57 on board 37 and, in turn, connected to one end of a conventional, magnetic relay 58 having contacts 59 and 60 disposed in line 28 and in series with contacts 35, 36.

The presence of water at the distal ends of probes 33, 51 results in a ground potential applied to wires 38, 56, thereby causing activation of coils 34, 58 and closure respectively of the associated context 35, 36 and 59, 60.

When the upper surface 61 of the water within the steam generator is below elevation 55, neither sensor 33 nor 51 detects water and thus, coils 34, 58 are deactivated, opening respectively contacts 35, 36, 59, 60, disrupting power to element 25. Sensor 33 contacts a great volume of water and steam within the generator since distal end 40 extends into the pressure vessel. Sensor 51, as distinguished from sensor 33, has a distal end 52 which projects into a relatively small compartment formed by coupling 50, thereby limiting the amount of water and steam contacting distal end 52. As such, sensor or probe 51 has reduced scale buildup and exhibits a longer life as compared to the other sensor. In certain instances, sensor 33 will fail in such a position that contacts 35 and 36 are closed together, continuing the flow of electrical energy to element 25. With the addition of the backup sensor 51 and the relatively small compartment formed by coupling 50, backup sensor 51 will still operate and thereby open contacts 59 and 60 whenever water level 61 falls below level 55, disrupting the power to element 25, and preventing the costly repair thereof.

Figure 2:
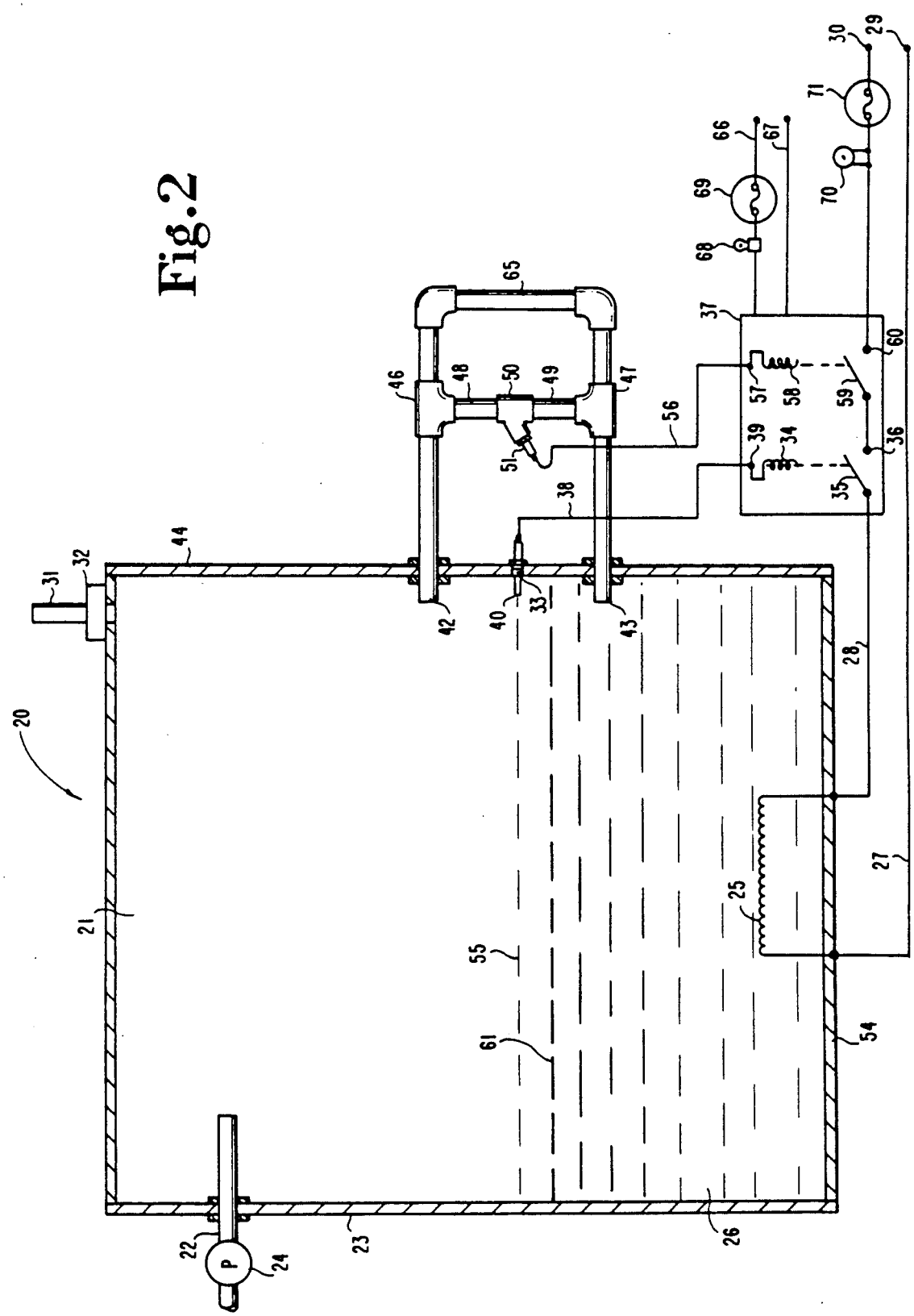
FIG. 2 is an enlarged, cross-sectional view of the steam generator located in the bottom portion of the cooker of FIG. 1.

It is known to provide a transparent tube in fluid communication with the pressure vessel to allow for the visual indication of the level of water within the vessel. I have added such a visual indicator to the back up safety system previously described. Thus, a pair of additional conduits 60, 61 are threadedly received respectively by fittings 46, 47. The opposite ends of conduits 60, 61 are threadedly received by a pair of right-angle couplings 62, 63 having mutually opposed threaded apertures receiving the opposite ends of a transparent tube 64. Tube 64 is therefore in communication with the liquid within the pressure vessel and will provide a visual indication of the level 61 (FIG. 2).

The power leads 66, 67 for board 37 may be provided with a indicator light 68 and fuse 69 for indicating and protecting the flow of energy to the board. Likewise, a similar indicator light 70 and fuse 71 may be provided in line 28 to indicate and protect the flow of electrical energy to element 25.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A low-water element safety control for a steam cooker comprising:

a closed container for holding liquid;

liquid entrance means associated with said container for introducing said liquid into said container;

steam exit means associated with said container for allowing escape of steam from said container;

heating means for heating said liquid and having an off position when disconnected from a source of energy and an on position for heating said liquid when connected to said source of energy;

first safety means having a first low liquid sensor located into said container, said safety means connected to said heating means operable to disconnect said heating means from said source of energy placing said heating means in said off position when said liquid is below said sensor; and, back up safety means connectable to a source of energy and defining a liquid passage extending out of said container with said passage having less volume than said container, said back up safety means further having an additional low liquid sensor located outside of said container in said passage, said back up safety means connected to said heating means being operable to disconnect said heating means from said source of energy when said liquid is below said additional low liquid sensor and even though said first safety means is inoperable.

2. The control of claim 1 wherein:
said container defines a main liquid chamber having a bottom portion whereat said first low liquid sensor is located, said back up safety means includes a conduit extending outwardly from said bottom portion of said container and in liquid communication therewith defining said passage, said additional low liquid sensor extending into said conduit and said passage to detect presence and absence of liquid therein.

3. The control of claim 2 and further comprising:
a transparent tube connected to said conduit and being located externally of said container, said tube in liquid communication with said passage allowing visual observation of liquid within said tube.

4. The control of claim 3 wherein:
said additional low liquid sensor is located remote from said main liquid chamber limiting scale accumulation and heat deterioration of said additional low liquid sensor from heated liquid in said main liquid chamber.

5. The control of claim 4 and further comprising:
first indicator means connected to said back up safety means operable to indicate connection of said back up safety means to a source of energy.

6. The control of claim 5 and further comprising:
second indicator means connected to said heating means operable to indicate connection of said heating means to a source of energy; and,
a fuse connected between said back up safety means and said source of energy.

7. A steam cooking device comprising:
a cooking compartment;
a main pressure vessel;
a control conduit extending outwardly from said pressure vessel and in liquid communication therewith;
a water conduit extending into said pressure vessel and connectable to a source of water;
pump means connected to said water conduit and operable to force water from said source of water to said pressure vessel;
a steam conduit extending out of said pressure vessel and into said cooking compartment;
heating means associated with said pressure vessel and connectable to a source of energy, said heating means operable to heat water located therein to turn same into steam;
an inside water sensor mounted at a first level inside said pressure vessel to detect absence of water at said first level;
regular safety means connected to said heating means and said inside water sensor being operable to disconnect said heating means from said source of energy when said liquid is below said first level;
an outside water sensor mounted at a second level inside said control conduit and outside said pressure vessel to detect absence of water at said second level, said control conduit having less volume than said pressure vessel reducing scale build up and heat deterioration of said outside water sensor as compared to said inside water sensor located in said pressure vessel; and,
back up safety means connected to said heating means and said outside water sensor being operable to disconnect said heating means from said source of energy when said liquid is below said second level and even though said regular safety means is inoperable.

8. The steam cooking device of claim 7 wherein:
said first level is at the same elevation as said second level.

9. The steam cooking device of claim 8 wherein:
said control conduit includes an outlet conduit extending out from said pressure vessel and an inlet conduit extending into said pressure vessel, said control conduit further includes a linking conduit which has opposite ends connected to and in fluid communication with said outlet conduit and said inlet conduit allowing liquid in said main pressure vessel to circulate therethrough, said control conduit includes an externally opening mounting passage extending into said control conduit at said level with said outside water sensor mounted thereto.

10. The steam cooking device of claim 9 and further comprising:
a transparent tube connected to and between said outlet conduit and said inlet conduit and being located externally of said container, said tube extending adjacent said control conduit at said second level being in liquid communication with said vessel allowing visual observation of liquid within said tube.

11. A steam cooking device comprising
a cooking compartment;
a main pressure vessel having a first volume ;
a control conduit having a second volume and extending outwardly from said pressure vessel and in liquid communication therewith;
a steam conduit extending out of said pressure vessel and into said cooking compartment;
heating means associated with said pressure vessel and connectable to a source of energy, said heating means operable to heat water located therein to turn same into steam;
an inside water sensor mounted at a first level inside said pressure vessel to detect absence of water at said first level;
regular safety means connected to said heating means and said inside water sensor being operable to disconnect said heating means from said source of energy when said liquid is below said first level;
an outside water sensor mounted at a second level inside said control conduit and outside said pressure vessel to detect absence of water at said second level, said second volume of said control conduit being less than said first volume of said pressure vessel reducing scale build up and heat deterioration of said outside water sensor as compared to said inside water sensor located in said pressure vessel; and,
back up safety means connected to said heating means and said outside water sensor being operable to disconnect said heating means from said source of energy when said liquid is below said second level and even though said regular safety means is inoperable.

12. The control of claim 11 wherein:

said control conduit includes an outlet conduit extending out from said pressure vessel and an inlet conduit extending into said pressure vessel, said control conduit further includes a linking conduit which has opposite ends connected to and in fluid communication with said outlet conduit and said inlet conduit allowing liquid in said main pressure vessel to circulate therethrough, said control conduit includes an externally opening mounting passage extending into said control conduit at said level with said outside water sensor mounted thereto.

13. The steam cooking device of claim 11 wherein:

said first level is at the same elevation as said second level.

* * * * *